United States Patent [19]
Lo et al.

[11] Patent Number: 5,754,525
[45] Date of Patent: May 19, 1998

[54] PROGRAMMABLE DELAY OF DISRUPT FOR SECURE NETWORKS

[75] Inventors: William Lo, Santa Clara; Ian Crayford, San Jose, both of Calif.

[73] Assignee: Advanced Micro Devices Inc., Sunnyvale, Calif.

[21] Appl. No.: 366,808

[22] Filed: Dec. 30, 1994

[51] Int. Cl.$^6$ ................................................. H04J 3/26
[52] U.S. Cl. ........................................ 370/94.1; 370/85.3
[58] Field of Search ........................ 370/60, 60.1, 94.1, 370/94.2, 61, 110.1, 85.1, 85.2, 85.3, 85.6, 76, 85.13, 94.3, 112, 75, 13.1; 340/825.5, 825.51, 825.52, 825.01, 825.02, 825.07, 825.31, 825.34; 379/97, 4; 455/11.1; 375/211, 213; 395/186, 741; 380/23, 3, 4

[56] References Cited

U.S. PATENT DOCUMENTS

| | | | |
|---|---|---|---|
| 4,680,755 | 7/1987 | Reames | 370/85.11 |
| 4,901,348 | 2/1990 | Nichols et al. | 370/60 |
| 5,099,517 | 3/1992 | Gupta et al. | 370/94.1 |
| 5,161,192 | 11/1992 | Carter et al. | 380/48 |
| 5,177,788 | 1/1993 | Schanning et al. | 380/23 |
| 5,179,554 | 1/1993 | Lomicka et al. | 370/85.13 |
| 5,251,203 | 10/1993 | Thompson | 370/13.1 |
| 5,353,353 | 10/1994 | Vijeh et al. | 380/29 |
| 5,390,299 | 2/1995 | Rege et al. | 370/60 |

FOREIGN PATENT DOCUMENTS 0 431 751 A1  12/1991  European Pat. Off. .

OTHER PUBLICATIONS

"Lecture Notes In Computer Science," Edited by Goos, G. and Hartmanis, J., Local Area Network Security, Edited by Berson, T.A. and Beth, T., Workshop LANSEC '89, E.I.S.S. Karlsruhe, FRG, Apr. 3–6, 1989, pp. 31–52.

"Information technology—Local and metropolitan area networks—Part 3: Carrier sense multiple access with collision detection (CSMA/CD) access method and physical layer specifications," ISO/IEC 8802–3, ANSI/IEEE Std. 802.3, Fourth edition, 1993 Jul. 8. (front page only).

*Primary Examiner*—Dang Ton
*Attorney, Agent, or Firm*—Townsend and Townsend and Crew LLP

[57] ABSTRACT

A secure repeater implementing data packet masking includes a programmable and selective, on a per port basis, delay disrupt response. A delay disrupt controller receives signals indicating retransmissions of fields from a data packet. These signals include a destination address field and a source address field. A plurality of memories, one associated with each port, determines the associated port's delay response to the data packet. Each memory stores a delay disrupt control code. When the delay disrupt control code for a particular port has a value indicating that the associated port is enabled to delay disruption of a data packet, security marking is disabled until the source address field is retransmitted from the particular port.

23 Claims, 5 Drawing Sheets

Fig_1

Fig_2

Fig_3

Fig_4

Fig_5

Fig_6

PROGRAMMABLE DELAY OF DISRUPT FOR SECURE NETWORKS

CROSS-REFERENCE TO RELATED APPLICATIONS

This application is related to "Address Tracking Over Repeater Based Networks", U.S. Pat. No. 5,353,353 issued on Oct. 10, 1994, "Repeater Security System," U.S. patent application Ser. No. 08/053,797 filed Apr. 26, 1993 now U.S. Pat. No. 5,353,353, U.S. patent application Ser. No. 08/337,634 filed Nov. 10, 1994, U.S. patent application for "Programmable Address Mapping Matrix for Secure Networks," filed Dec. 30, 1994 (application Ser. No. 08/366,809), and U.S. patent application for "Programmable Disrupt of Multicast Packets for Secure Networks," filed Dec. 30, 1994 (application Ser. No. 08/366,806), all hereby expressly incorporated by reference for all purposes.

BACKGROUND OF THE INVENTION

The present invention relates generally to data packet security within a local area network and more specifically to an improved secure computer network having a selectable delay of disrupt within a network that uses Multiport Secure Repeaters.

Networks of computers are commonly used in todays business environment. One common network system structure uses one or more repeaters. The repeater typically includes several ports. A particular data packet received at one port is retransmitted from the other ports of the repeater. Each repeater restores timing and amplitude degradation of data packets received on one port and retransmits them to all other ports, and hence over the network. For networks employing a CSMA/CD-type of network, such as an Ethernet network, every data packet passes through every repeater. Network administrators are thereby able to conveniently use each repeater as a device on the network from which to gather information concerning the operation of the network.

In traditional Ethernet (802.3 10BASE5) and Cheapernet (802.3 10BASE2), a coaxial cable provides a linear bus to which all nodes of a local area network are connected. A standard promulgated by the IEEE (IEEE Standard 802.3) defines various functionality for computer networks. This standard is expressly incorporated by reference for all purposes. Signaling is accomplished using a current synch technique wherein a center conductor of the coaxial cable is used for a signal and a shield conductor of the coaxial cable is used for a reference voltage (typically ground). Twisted pair Ethernet (802.3 10BASE-T) uses a standard voice grade telephone cable rather than the coaxial cable. The telephone cable uses separate pairs of conductive wires for transmission and reception.

When using twisted pair Ethernet, the network configuration is a star topology. The star topology provides for several end stations or data terminal equipment (DTE) devices all coupled to a multi-port repeater located at a center of the star. The repeater performs signal amplitude and timing restoration. The repeater receives a bitstream at one of its ports and restores signal amplitude levels and timing requirements. The repeater repeats the reshaped and retimed input bitstream to all of its other ports. In one sense, the repeater acts as a logical coaxial cable, permitting every node connected to the twisted pair network to receive each transmission from any other node, just as when a coaxial cable is used. The pairs of conductors use differential signaling, one pair for transmission and another pair for reception.

While a repeater is used in a traditionally wired coaxial Ethernet network as a mechanism to extend the physical distance limit of the network, in the IEEE 802.3 10BASE-T, the standard mandates the use of a repeater to provide connectivity between nodes whenever more than two nodes are present. Although physical signaling on the cabling differs between the traditional Ethernet-type of repeater and the twisted pair-type of repeater, the functionality of the repeaters are identical, as is the frame or packet format that is used to pass messages between the participating nodes on the network.

The frame commences with a preamble sequence which is an alternating ("1" and "0") pattern. The preamble sequence provides a single frequency on the network, in this case five MegaHertz (MHz) at the start of each frame, allowing a receiver to acquire and lock onto the associated bitstream. The preamble sequence is followed by a start of packet identifier that immediately precedes the data portion of the transmission. Either a start of frame delimiter (802.3) or synch sequence (Ethernet) delineates the start of the data portion of the message. Following the start of packet identifier are two address fields: a destination address (DA) and a source address (SA). These addresses are both forty-eight bit values and are transmitted least significant bit (LSB) first.

A media access controller (MAC) associated with each DTE uses the destination address to determine whether an incoming packet is addressed to the node it is associated with. When a receiving node detects a match between its own node address and an address transmitted in the destination address field, it attempts to receive the packet. Nodes having a MAC that does not detect a matching address typically ignore a remainder of the packet.

There are three types of destination addressing supported by the 802.3 standards:
1. Individual. The DA field contains an individual and unique address assigned to a single node on the network.
2. Multicast. When the first bit (LSB) of the DA is set, the remainder of the DA includes a group address. The group of nodes that are actually addressed is determined by a higher layer function. In general, use of a group address is designed to transmit a message to a logically similar subset of nodes on the network.
3. Broadcast. The broadcast is a special form of multicast address wherein the DA field is set to all "1's." This address is reserved, and all nodes on the network must be capable of receiving a broadcast message.

The MAC that transmits a data packet writes its own address into the SA field. This allows the transmitting MAC to identify those packets which it originates. The 802.3 standards do not require that a receiving MAC take any action based upon the SA field. In some applications, such as management, security or configuration, the SA field may be tracked and monitored.

A two-byte length/type field follows the SA field. The choice of length or type is dependent upon whether the frame is compatible with the IEEE 802.3 or the Ethernet standard. A higher order byte of the length/type field is transmitted first, with the LSB of each byte transmitted first.

A data field contains actual packet data that is transferred between end stations and is between forty-six to fifteen hundred bytes in length. A logical link control (LLC) function is responsible for fragmenting data into block sizes suitable for transmission over the network. Data bytes are transmitted sequentially with the LSB of each byte transmitted first.

A frame check sequence (FCS) is a four-byte field that contains a cyclic redundancy check (CRC) for the entire frame. The transmitting station computes the CRC throughout the DA, the SA, the length/type field, and data field. The transmitting station appends the FCS as the last four bytes of the frame. A receiving station uses the same CRC algorithm to compute the CRC for a received frame. The receiving station compares the CRC value it computes with the CRC value in the transmitted FCS. A mismatch indicates an error, such as a corrupted data frame. CRC bits of the FCS are transmitted in order: most significant bit (MSB) to LSB.

Figure 1:
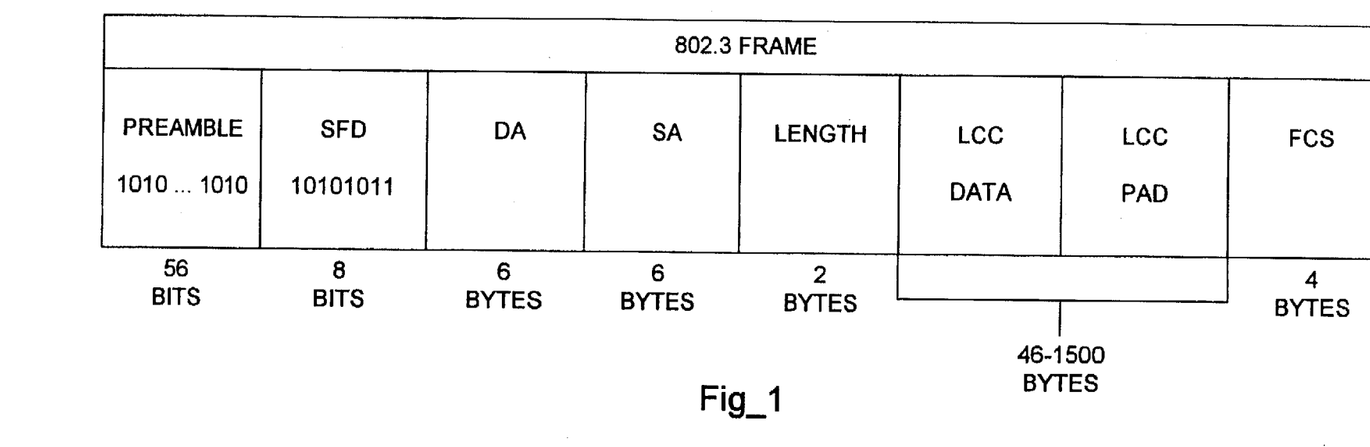
FIG. 1 is a diagram illustrating an IEEE 802.3 compliant frame format.
Figure 2:
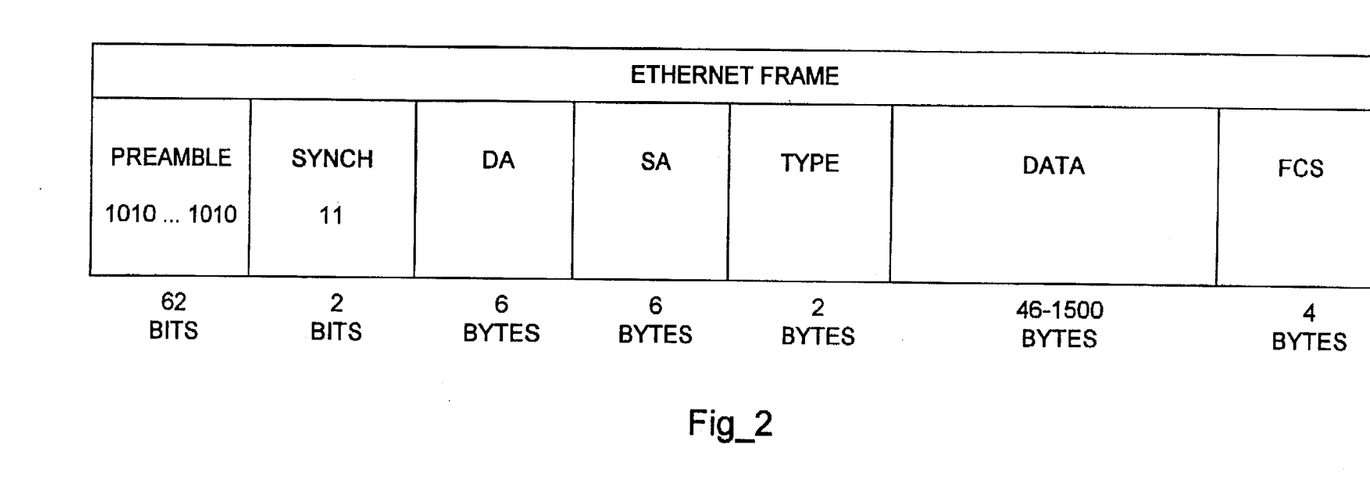
FIG. 2 is a diagram illustrating an Ethernet compliant frame format.

FIG. 1 and FIG. 2 are diagrams illustrating frame formats for an IEEE 802.3 Standard compliant frame and an Ethernet frame, respectively. Comparing the frame formats illustrates that a primary difference between the frame types is that the start of frame delimiter (SFD) for 802.3 is defined as a byte that has a "1 0 1 0 1 0 1 1" pattern whereas the start frame (synch) of Ethernet is a "11" sequence. Even so, in both cases, a total number of bits for the preamble plus the start of frame indication is sixty-four bits long.

The 802.3 and Ethernet standards both specify that a packet must be in the range of sixty-four to fifteen hundred eighteen bytes (excluding preamble/SFD). However, the actual data field in the 802.3 system is permitted to be smaller than the forty-six byte value that is necessary to ensure this minimum size. To handle a smaller size data field, the MAC of a transmitting station appends pad characters to the LLC data field before sending data over the network. The Ethernet standard assumes that an upper layer ensures that the minimum data field is forty-six bytes before passing data to the MAC, therefore the existence of appended pad characters in unknown to the MAC implementing an Ethernet format.

The 802.3 standard also uses a length field that indicates the number of data bytes that are in the data field only. Ethernet, on the other hand, uses a type field in the same two bytes to identify the message protocol type. Since valid Ethernet type fields are always assigned outside of the valid maximum 802.3 packet length size, both 802.3 and Ethernet packets can coexist on the same network. Hence, it has been found that it is important to be able to track and monitor the addresses for a variety of reasons. For example, for secure networks it may be important that authentication is required to ensure that the appropriate nodes on the network receive the information. In addition, as networks change in the number of nodes attached thereto, it becomes important to be able to associate an address with a particular port or the like within the network.

It is also important in secure networks to selectively prevent a node from receiving such address and/or data information unless the node requires the information. If a data packet is not destined for a particular node, the particular node generally does not have a need for information within the data packet.

Further, it is important to provide a mechanism to associate the addresses of each port of a repeater with the actual port number or identity of the device. Typically, unsecured repeaters are devices that are just used for signal amplitude and timing restoration. In all of the above-mentioned modes, the secure repeater must also be provided with the capability to detect and interpret the various fields within data packets that are transmitted on the network.

As described above, every data packet transmitted in the computer network includes a destination address to identify the recipient of the data packet. A secure repeater in a secure network may have one or more end stations attached to each port. Each end station has one unique address assigned, and possibly one or more multicast addresses. The secure repeater maintains a list of associated end stations for each output port. The security systems identified in the incorporated references use the destination address field from each data packet to route a data packet to only those output ports associated with the destination address. Output ports of the secure repeater associated with a destination address not matching the destination address receive a modified, or disrupted, data packet. In the preferred embodiment of the secure environment, it is common not to begin disruption until after the destination address field has been transmitted. In other words, every field following the destination address (from the source address on) is disrupted.

The security system functions well in normal operation. There are times when a particular port should be enabled to receive not only the destination address, but the source address as well, even when the data field is to be disrupted. This situation may arise, for example, when an administrator desires to use automatic network administrative tools to map a network, or to collect particular network statistics from the various nodes.

SUMMARY OF THE INVENTION

The present invention provides apparatus and method for simply and efficiently selectively delaying secure repeater disruption of a data packet. Certain ports are set to enable them to delay disruption of a data packet until a field following the destination address is transmitted, and others are set to begin disruption immediately after the destination address.

According to one aspect of the invention, it includes an apparatus for delaying a disrupt response to a data packet. The apparatus includes a repeater having an input port for receiving a data packet having a destination address field, a source address field, a data field, and an output port, the repeater includes a security system for transmitting the data packet from the output port when an associated address matches the destination address field, the security system transmitting an output data packet from the output port when the associated address does not match the destination address field; and a delay disrupt controller, coupled to the output port and the security system, for controlling transmission of the output data packet, the delay disrupt controller selecting a mode for the security system. The output data packet, in the preferred embodiment, includes one of two types of packets. A first type has an undisrupted destination and source address field, and a disrupted data field. The second type of output data packet includes an undisrupted destination address field, and disrupted source address and data fields.

In a further preferred embodiment of the present invention, the delay disrupt controller includes a plurality of memories, one memory associated with each output port. The memories store a plurality of delay disrupt control codes, each delay disrupt control code indicating whether its associated output port is to receive a delayed disrupted data packet.

In operation, the controller selectively, on a per port basis, delays disruption of a data packet by the security system of the repeater. Each port is established as either delaying disruption of a data packet, or not delaying the disruption, when no match between the destination address and any addresses associated with the ports. When the data packet is transmitted, only those ports established as having the delay disrupt enabled will transmit the source address to the data packet. This allows a network administrator to determine which ports will receive source address fields of every data packet so that destination address/source address pairs may be monitored, for example.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

DESCRIPTION OF THE PREFERRED EMBODIMENT

Figure 3:
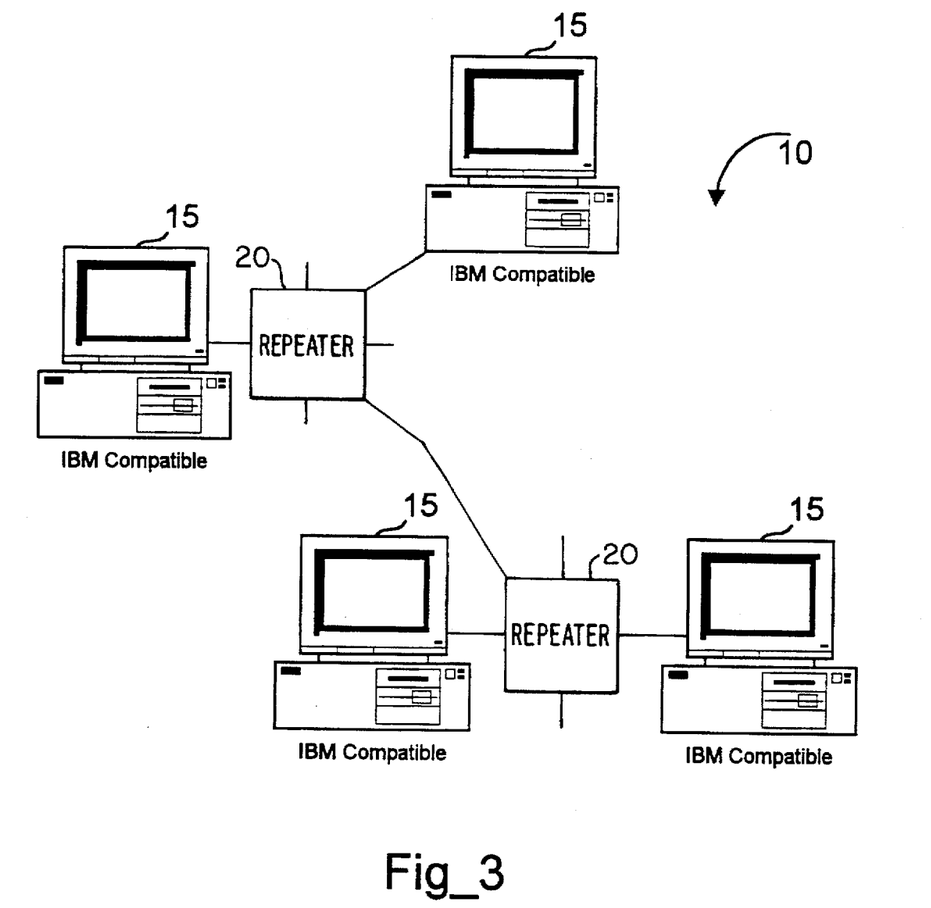
FIG. 3 is a block schematic diagram of a network of a plurality of personal computers implementing a star topology, the network including a secure repeater at each hub.

FIG. 3 is a block schematic diagram of a network 10 of a plurality of end stations 15 (e.g. personal computers) implementing a star topology, network 10 includes a secure repeater 20 at each hub. The preferred embodiment is implemented using a carrier sense multiple access with collision detection (CSMA/CD) compliant network. Secure repeater 20 conforms to the incorporated IEEE Standard 802.3.

In operation, network 10 passes a data packet from one end station 15, through one or more secure repeaters 20, to another end station 15. Secured repeater 20 receives the data packet at one port, and retransmits the data packet from other ports. Secure repeater 20 implements security features, such as data packet data masking, as described in the incorporated references.

Figure 4:
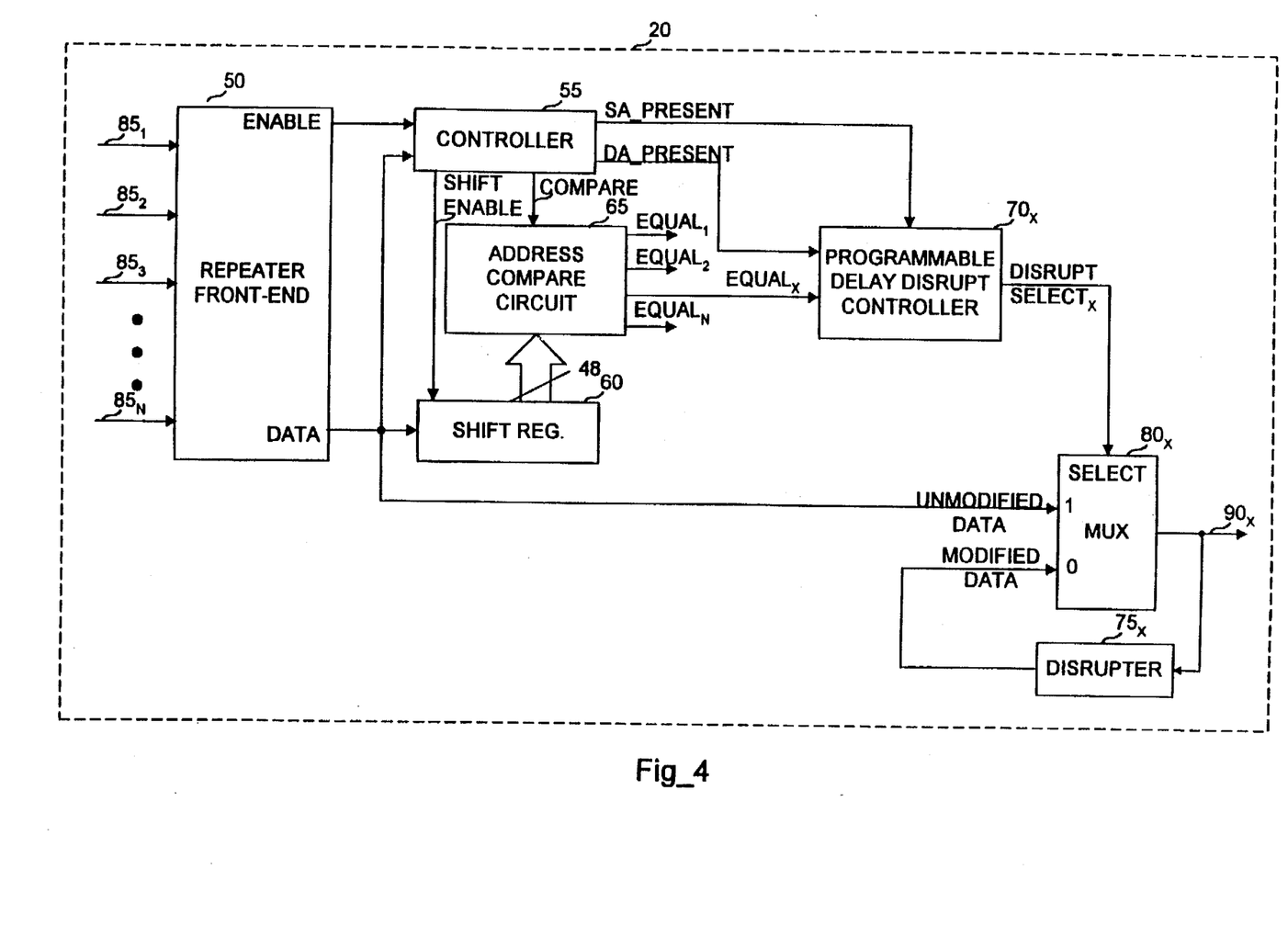
FIG. 4 is a detailed schematic block diagram of the secure repeater implementing selective delay disrupt response.

FIG. 4 is a detailed schematic block diagram of secure repeater 20 shown in FIG. 3 implementing selective delay disrupt response. Secure repeater 20 includes a repeater front-end 50, a controller 55, a shift register 60, an address compare circuit 65, a plurality of programmable delay disrupt controllers $70_i$, a plurality of disrupters $75_i$, and a plurality of output data multiplexers $80_i$.

For ease of explanation, only one programmable delay disrupt controller ($70_X$), one disrupter $75_X$, and one multiplexer $80_X$ are shown. It is understood that there is one disrupt controller, one disrupter and one multiplexer for every EQUAL line from address compare circuit 65. Repeater front-end 50 receives a data packet at a particular one port of a plurality of input ports $85_i$, i=1 to n, with n being the number of ports. Repeater front-end 50 processes the data packet in conformance with the incorporated IEEE 802.3 standard. Repeater front-end 50 outputs an ENABLE signal and a DATA signal that is a serial output stream. DATA is driven with the data from the input data packet. ENABLE is asserted as long as repeater front-end 50 drives DATA with valid data from the data packet.

Controller 55 is coupled to repeater front-end 50 and receives the ENABLE signal and the DATA signal. As described in more detail below, controller 55 includes logic to assert a SHIFT_ENABLE signal, a COMPARE signal, a DA_PRESENT signal and an SA—PRESENT signal, all responsive to the ENABLE and DATA signals.

Shift register 60 is coupled to both repeater front-end 50 and controller 55. Shift register 60 is a right shifting register that receives DATA at its input. Shift register 60 is responsive to an assertion of the SHIFT_ENABLE signal to shift bits of DATA into its memory. Shift register 60 holds forty-eight bits (six bytes), corresponding to the size of the destination address in the data packet. The bits stored in shift register 60 are output on a forty-eight bit wide output.

Address compare circuit 65 is coupled to controller 55 and shift register 60. Address compare circuit 65 is an associative memory that associates one or more destination addresses with output ports. Address compare circuit 65 of the preferred embodiment includes n number of $EQUAL_X$ output lines, X=1 to n. One EQUAL line corresponds to each output port. When COMPARE is asserted, address compare circuit 65 compares the forty-eight bits output from shift register 60 to the destination addresses stored in memory. For each match, address compare circuit 65 asserts $EQUAL_X$ for the output port having an associated address matching the output of shift register 60. Any number, from zero to all, of the $EQUAL_X$ lines may be asserted after the compare. Additional details regarding structure and operation of address compare circuit 65 are described in the incorporated references.

Each programmable delay disrupt controller $70_i$ is coupled to controller 55, and address compare circuit 65. Each delay disrupt controller $70_i$ receives a different one of the EQUAL signals, one delay disrupt controller $70_i$ for each, as well as the global DA_PRESENT signal and the global SA_PRESENT signal. In response to assertions of DA_PRESENT, $EQUAL_X$, and SA_PRESENT, a particular one delay disrupt controller $70_X$ drives a DISRUPT $SELECT_X$ signal either HIGH or LOW.

Delay disrupt controller $70_X$ drives DISRUPT $SELECT_X$ according to the following logic equation:

DISRUPT $SELECT_X$ =

$\overline{(EQUAL\ X) \cap (DA\_PRESENT) \cap (SA\_PRESENT \cup \overline{A(X)})}$ where A(X) represents a programmable register output that is asserted when the delay disrupt feature for port X is enabled.

The logic equation may be represented by the following truth table:

| $EQUAL_x$ | DA_PRESENT | SA_PRESENT | A(X) | DISRUPT $SELECT_x$ |
|---|---|---|---|---|
| 1 | X | X | X | 1 |
| X | 0 | X | X | 1 |
| X | X | 0 | 1 | 1 |
| 0 | 1 | 0 | 0 | 0 |
| 0 | 1 | 1 | X | 0 |

1 - The signal is asserted
0 - The signal is deasserted
X - Don't Care

Disrupter $75_X$ provides modified data to output port $90_X$ in place of DATA whenever port $90_X$ is not to retransmit DATA, i.e., the data packet masking feature is activated. As implemented, disrupter $75_X$ outputs alternating "1's" and "0's" by implementing a simple multivibrator. In the preferred embodiment, disrupter $75_X$ has an input of a flip-flop coupled to output port $90_x$, and an inverter coupled to an output of the flip-flop. The output of the inverter is the output of disrupter $75_x$.

Multiplexer $80_x$ includes two inputs, a "0" input coupled to the output of disrupter $75_x$ and a "1" input coupled to DATA from repeater front-end 50. Multiplexer $80_x$ is responsive to DISRUPT SELECT$_x$ provided at a SELECT input to route one of the inputs to output port $90_x$. When DISRUPT SELECT$_x$ is driven LOW, multiplexer $80_x$ routes modified data from disrupter $75_x$ to output port $90_x$. When DISRUPT SELECT$_x$ is driven HIGH, multiplexer $80_x$ routes DATA to output port $90_x$.

In operation, repeater front-end 50 receives a data packet at one of its input ports $85_i$. Repeater front-end 50 drives DATA with the serial bits contained in the data packet and asserts ENABLE when DATA is valid. Forty-eight bits immediately following the start of frame delimiter make up the destination address field.

Controller 55 counts the incoming bits of DATA. SHIFT_ENABLE is asserted until the destination address is shifted into shift register 60, at which point shift register 60 is locked by deasserting SHIFT_ENABLE. Controller 55 asserts DA_PRESENT, after a predetermined delay, once the destination address has been locked into shift register 60. Controller 55 deasserts SA_PRESENT until the source address has been driven on the DATA output line. Controller 55 asserts COMPARE after deasserting SHIFT_ENABLE and locking the destination address into shift register 60.

Assertion of COMPARE causes address compare circuit 65 to compare the destination address, locked in shift register 60, to each of a plurality of stored addresses. These stored addresses correspond to associated end user stations 15 (shown in FIG. 3) coupled to output ports 90 of secure repeater 20. In other words, a particular end user station $15_x$, having an address ADDRESS$_x$, that is coupled to output port $90_x$, has ADDRESS$_x$ stored in a particular memory of compare circuit 65 that is associated with PORT $90_x$. When the destination address stored in shift register 60 is compared with all the stored addresses, one or more EQUAL$_x$ signals are asserted when a match is found. EQUAL$_x$ is asserted for each port $90_x$ x having a matching associated stored address.

A particular delay disrupt controller $70_x$ receives the DA_PRESENT signal, the SA_PRESENT signal, and the EQUAL$_x$ signal. As described above, while DA_PRESENT is deasserted, delay disrupt controller $70_x$ drives DISRUPT SELECT$_x$ HIGH, thereby routing DATA to output port $90_x$. As DA_PRESENT stays deasserted until the destination address is completely shifted into shift register 60, the DA_PRESENT signal ensures that a valid destination address is always transmitted from each output port 90. After controller 55 asserts DA_PRESENT, delay disrupt controller $70_x$ drives DISRUPT SELECT$_x$ LOW unless EQUAL$_x$ is asserted or SA_PRESENT is deasserted and delay disrupt for port $90_x$ is enabled. When DISRUPT SELECT$_x$ is LOW, modified data is output from output port $90_x$.

Delay disrupt controller $70_x$ satisfies the logic table shown above and asserts DISRUPT SELECT$_x$ HIGH or LOW depending upon the values of the input signals.

Figure 5:
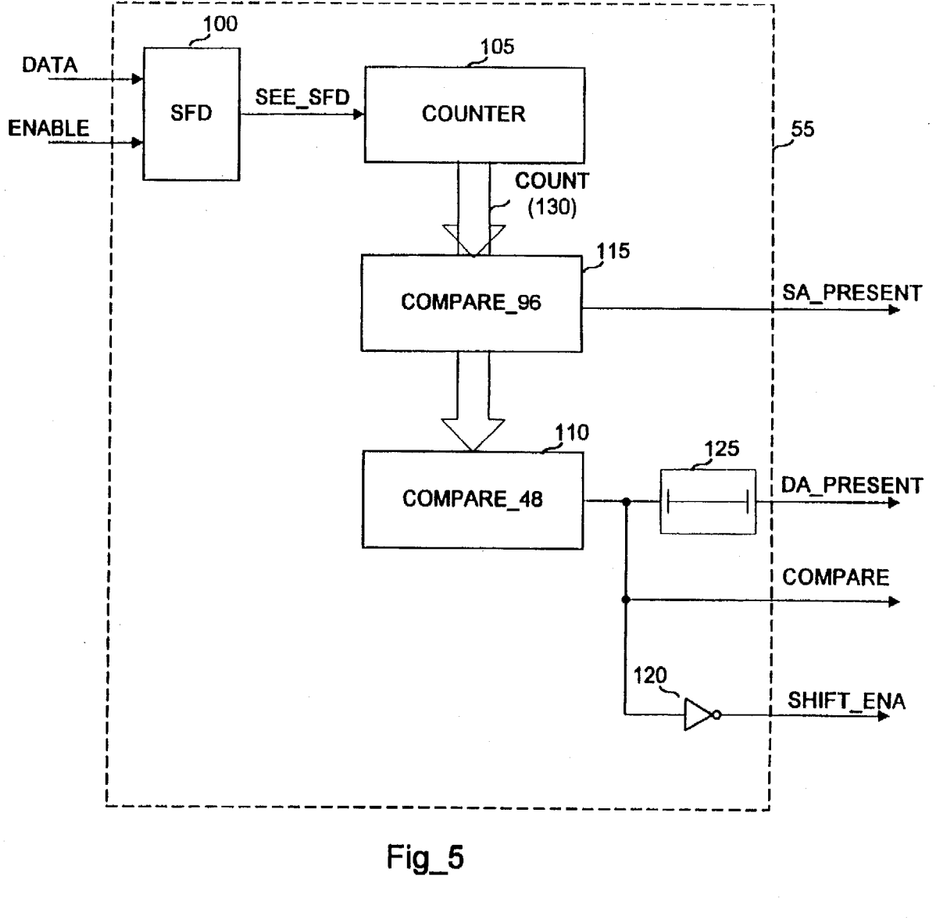
FIG. 5 is a detailed block diagram of a controller used in the secure repeater shown in FIG. 4.

FIG. 5 is a detailed block diagram of controller 55 shown in FIG. 4. Controller 55 includes a start frame detector (SFD) 100, a counter 105, a first compare circuit 110, a second compare circuit 115, an inverter 120, and a delay element 125. The DATA and ENABLE signals are input into SFD 100. SFD 100 monitors DATA for the start of frame delimiter. After the start of frame delimiter is detected, SFD 100 asserts a SEE_SFD signal. The SEE_SFD signal is asserted after the SFD is detected and remains asserted as long as ENABLE remains asserted.

Counter 105 is coupled to SFD 100 and is responsive to the SEE_SFD signal to increment a total count once per bit time. Thus, counter 105 counts each bit of DATA after the start of frame delimiter. The total count of counter 105 is output on seven lines making up count bus 130.

First compare circuit 110 and second compare circuit 115 are coupled to count bus 130 and each monitors the total count of counter 105. Initially, COMPARE is LOW. When counter 105 counts to forty-eight (48), first compare circuit 110 asserts the COMPARE signal HIGH. An input of inverter 120 is coupled to the output of compare circuit 110. An output of inverter 120 drives the SHIFT_ENABLE signal. An input of delay element 125 is also coupled to the output of first compare circuit 110. An output of delay element 125 is the DA_PRESENT signal. An amount of delay set by delay element 125 allows for the compare procedure to complete and an EQUAL$_x$ to be asserted before changing state. Controller 55, in the preferred embodiment, asserts SHIFT_ENABLE and deasserts DA_PRESENT until counter 105 counts to forty-eight.

When counter 105 counts ninety-six (96) bits after the SFD, second compare circuit 115 asserts SA_PRESENT. SA_PRESENT is initially LOW, and transitions HIGH after the source address has been transmitted in the DATA signal. While the preferred embodiment uses the destination address fields and the source address fields, by adjusting the counters, for example, it would be possible to select other fields. For example, in an alternate implementation, it may be desirable to always pass the DA and SA, but selectively delay the data field. Appropriate adjustment of the counter compare values could implement the alternate embodiment simply.

Figure 6:
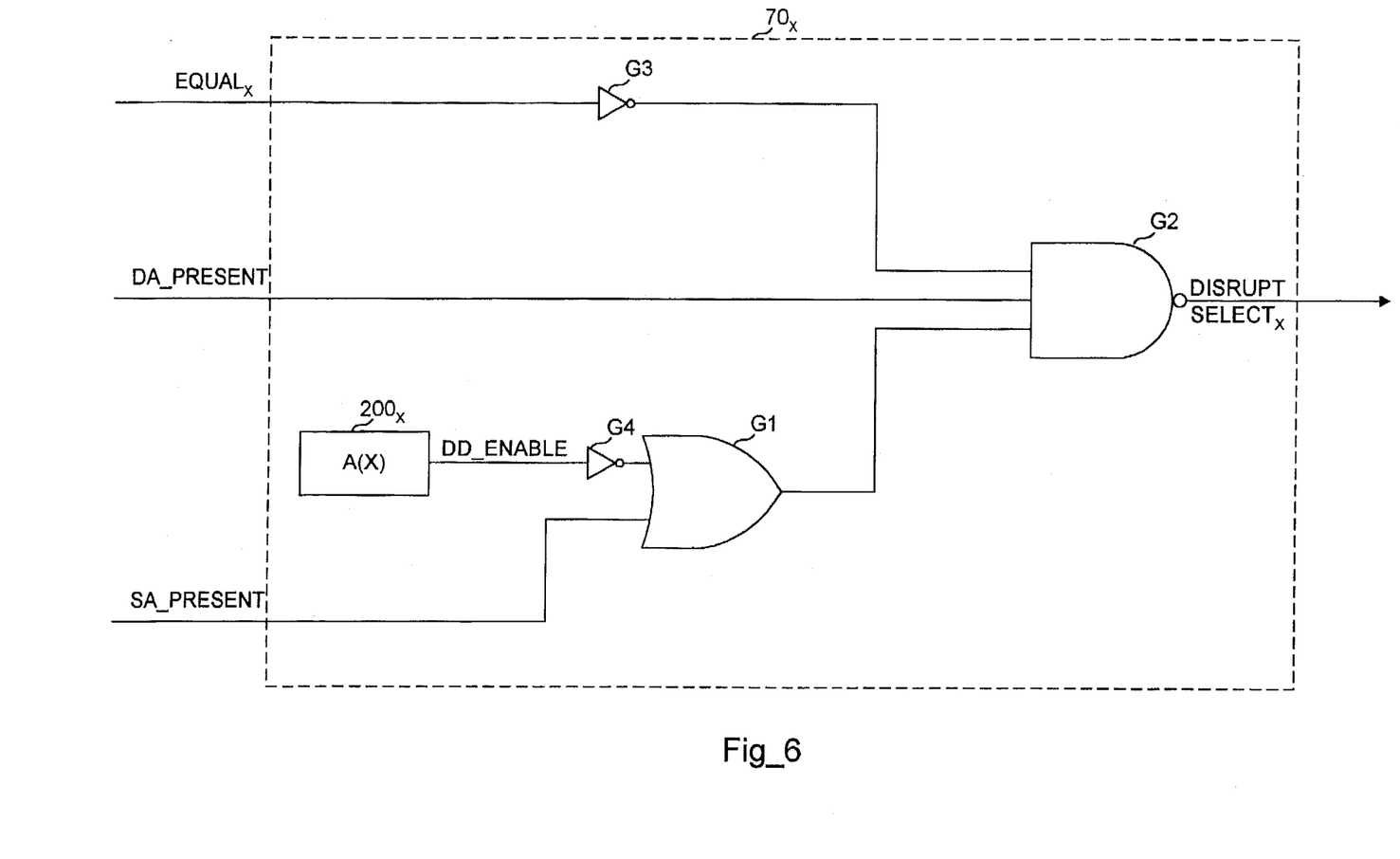
FIG. 6 is a detailed schematic diagram of the delay disrupt controller shown in FIG. 4.

FIG. 6 is a detailed schematic diagram of a preferred embodiment for delay disrupt controller $70_x$ shown in FIG. 4. Delay disrupt controller $70_x$ includes a dual input OR gate G1, a triple input NAND gate G2, two inverters (G3 and G4), and an externally-programmable latch $200_x$. Latch $200_x$ stores a delay disrupt control code to control (disable or enable) the delay disrupt feature for its associated port. When latch $200_x$ stores a first value enabling the delay disrupt feature, latch $200_x$ asserts a DELAY DISRUPT ENABLE (DD_ENABLE) signal. When the delay disrupt feature is disabled, the DD_ENABLE signal is deasserted.

An input of inverter G4 is coupled to the output of latch $200_x$. An output of inverter G4 is coupled to one input of OR gate G1. A second input of OR gate G1 is coupled to controller 55, shown in FIGS. 4 and 5, to receive the SA_PRESENT signal.

NAND gate G2 has one input coupled to an output of OR gate G1, another input coupled to controller 55, shown in FIGS. 4 and 5, to receive the DA_PRESENT signal. An input of inverter G3 receives the EQUAL$_x$ signal from COMPARE circuit 65, shown in FIG. 4. An output of inverter G3 is coupled to the third input of NAND gate G2. An output of NAND gate G2 drives the DISRUPT SELECT$_x$ signal for delay disrupt controller $70_x$.

In operation, delay disrupt controller $70_x$ receives the EQUAL$_x$, the DA_PRESENT, and the SA_PRESENT signals. These signals are all initially deasserted, in the preferred embodiment, resulting in an assertion of the DISRUPT SELECT$_x$ signal. After the destination address is transmitted in the DATA signal, and allowing for sufficient delay to perform the compare procedure and to determine whether compare circuit 65 asserts the EQUAL$_x$ signal or not, DA_PRESENT is asserted. With no match (EQUAL$_x$ deasserted), and with DA_PRESENT asserted, the state of the DISRUPT SELECT$_X$ signal is determined by the state of the output of OR gate G1.

If the disrupt delay feature is not enabled, latch 200x deasserts the DD_ENABLE signal. Inverter G4 will then assert a HIGH input to OR gate G1. OR gate G1 asserts its output when either input is asserted HIGH. The HIGH output of OR gate G1 results in the DISRUPT SELECT$_X$ being asserted HIGH as soon as DA_PRESENT is asserted. The value of SA_PRESENT does not affect the result when the delay disrupt feature is disabled.

When delay disrupt is enabled, latch 200$_X$ asserts the DD_ENABLE signal to inverter G4. Inverter G4 thereafter deasserts its input to OR gate G1. The output of OR gate G1 will, when delay disrupt is enabled, match the state of the SA_PRESENT signal. Thus, the output of OR gate G1 is not asserted until SA_PRESENT is asserted. With EQUAL$_X$ deasserted, DA_PRESENT asserted, and delay disrupt enabled, the state of the DISRUPT SELECT$_X$ signal is controlled by the state SA_PRESENT signal (at the output of OR gate G1). Until SA_PRESENT is asserted (in other words, as long as DATA has not transmitted the source address field) the DISRUPT SELECT$_X$ signal is asserted. Assertion of DISRUPT SELECT$_X$ routes DATA, rather than a disrupted data packet to output port 90$_X$. Thus, output port 90$_X$ retransmits both the destination address field and the source address field. After the source address field is retransmitted, SA_PRESENT is asserted. The assertion of SA_PRESENT results in an assertion of the output of OR gate G1, and a deassertion of the output of NAND gate G2. Deasserting the output of NAND gate G2 deasserts the DISRUPT SELECT$_X$ signal, causing multiplexer 80$_X$ to route modified data to output port 90$_X$ for retransmission. With DA_PRESENT and SA_PRESENT asserted, DISRUPT SELECT$_X$ will be deasserted (causing modified data to be transmitted) unless EQUAL$_X$ is asserted. Assertion of EQUAL$_X$ signifies that a match was found between the destination address and a DTE coupled to output port 90$_X$. With a match, no part of DATA should be masked, providing that all of the DATA signal will be retransmitted from output port 90$_X$. Assertion of EQUAL$_X$ results in DISRUPT SELECT$_X$ being asserted.

As described, secure repeater 20 provides for selective and programmable, on a per port basis, disrupt delay response for a particular field of a data packet. Some or all ports can be disabled from the delayed disrupt response, allowing retransmission of only destination address fields from ports having non-matching addresses, with disabled ports transmitting modified data packets. Other ports can be enabled to retransmit both source address and destination address fields from a port. Writing different values into register 200$_X$, for different values of X, results in different delay disrupt responses for the ports of secure repeater 20.

In conclusion, the present invention provides a simple, efficient solution to selective response of a secure repeater to a data packet. While the above is a complete description of the preferred embodiments of the invention, various alternatives, modifications, and equivalents may be used. For example, while the preferred embodiment chooses to delay a disrupt response for a non-matching port until a source address is retransmitted, other implementations may delay response for other fields, or additional fields. Therefore, the above description should not be taken as limiting the scope of the invention which is defined by the appended claims.

What is claimed is:

1. An apparatus for controlling a disrupt response to a data packet, comprising:

a repeater including an input port for receiving the data packet having a destination address field, a source address field and a data field, and an output port, said repeater including a security system for allowing a transmission of said data packet from said output port, said output port having an associated address, when said associated address matches said destination address field, and for allowing a transmission of an output data packet from said output port when said associated address does not match said destination address field; and a delay disrupt controller, coupled to said security system, for selectably controlling said security system, said security system operating in a particular one mode selected from a plurality of modes, said plurality of modes including a first mode and a second mode, said first mode providing said output data packet with said destination address field undisrupted, and said source address field and said data field disrupted, and said second mode providing said output data packet with said destination field and said source address field undisrupted, and said data field disrupted.

2. The apparatus of claim 1 further comprising:

a memory, coupled to said delay disrupt controller, for storing a delay disrupt control code for selecting said particular one mode.

3. The apparatus of claim 2 wherein said delay disrupt control code has one of a first value and a second value, said delay disrupt controller selecting said first mode for said particular mode when said delay control code has said first value and selecting said second mode for said particular mode when said delay control code has said second value.

4. A repeater having a plurality of ports, comprising:

a repeater front-end for receiving a data packet at a first port of the plurality of ports, said data packet including, in relative order, a destination address field, a source address field and a data field, said repeater front-end driving a first output with said data packet and driving a second output with an enable signal;

a disrupter, coupled to an output port of said repeater front-end, for providing a modified data packet at an output of said disrupter;

a shift register, coupled to said repeater front-end and responsive to a shift enable signal, for extracting said destination address field from said data packet;

an address compare circuit, coupled to said shift register and responsive to an assertion of a compare signal, for comparing said destination address to a plurality of stored addresses, each stored address corresponding to one of the plurality of ports, said address compare circuit having a plurality of equal signals each corresponding to one of said stored addresses wherein said address compare circuit asserts a first particular one equal signal when a first particular stored address matches said destination address field and deasserts a second particular one equal signal when said first particular stored address does not match said destination address;

a controller, coupled to said repeater front end, said shift register and said address compare circuit, and responsive to said enable signal and to said data packet, for asserting said shift enable signal, said compare signal, a destination address present signal, and a source address present signal;

a plurality of delay disrupt controllers, a particular one delay disrupt controller coupled to said first particular one equal signal, for driving a plurality of disrupt select signals having a first state and a second state, said particular one delay disrupt controller including a memory for storing a delay disrupt control code and for driving a particular one disrupt select signal with said first state until said destination address present signal is asserted when said delay disrupt control code has a first value, otherwise said particular one delay disrupt controller driving said particular one disrupt select signal with said first state until said source address present signal is asserted when said delay disrupt control code has a second value; and a multiplexer, coupled to said repeater front-end and to said disrupter, for routing said data packet to a particular output port of the repeater that corresponds to said particular one delay disrupt controller when said particular one disrupt select signal has said first state, otherwise, said multiplexer routing said modified data packet to said particular one output port when said particular one disrupt select signal has said second state.

5. The repeater of claim 4 wherein said address compare circuit asserts a second particular one equal signal when a second particular stored address matches said destination address field and deasserts said second particular one equal signal when said second particular stored address does not match said destination address field, the repeater further comprising:

a second particular one delay disrupt controller, coupled to said compare circuit and to said controller, and responsive to said second particular one equal signal, for driving a second particular one disrupt select signal having said first state and said second state, said second particular one delay disrupt controller including a second memory for storing a second delay disrupt control code for driving said second particular one disrupt select signal with said first state until said destination address present signal is asserted when said second delay disrupt control code has said first value, otherwise said second particular one delay disrupt controller driving said disrupt select signal with said first state until said source address present signal is asserted when said second delay disrupt control code has said second value;

a second disrupter, coupled to said repeater front-end, for providing a second modified data packet at an output of said second disrupter; and a second multiplexer, coupled to said repeater front-end and to said second disrupter, for routing said data packet to a second particular one output port of the repeater that corresponds to said second particular one delay disrupt controller when said second particular one disrupt select signal has said first state, otherwise said second multiplexer routing said second modified data packet to said second particular one output port when said second particular one disrupt select signal has said second state.

6. The repeater of claim 5 wherein said delay disrupt code has said first value and said second delay disrupt code has said second value.

7. A method for transmitting an output packet from a repeater including an input port for receiving a data packet having, in relative order, a destination address field, a source address field and a data field, and an output port, the repeater including a security system for allowing a transmission of an output packet from the output port, the output port having an associated address when the associated address matches the destination address field, and for an output data packet from the output port when the associated address does not match the destination address field, the method comprising the steps of:

detecting when the destination address field has been received;

detecting when the source address field has been received;

transmitting unmodified the destination address field from the output port;

transmitting the source address field unmodified when source address retransmission is enabled and the destination address field does not match an output port address associated with the output port, otherwise transmitting the source address field modified when source address retransmission is disabled and the destination address field does not match said output port address; and transmitting the data field modified when the destination address field does not match said output port address.

8. A repeater comprising:

a repeater front-end including an input port for receiving a data packet having, in relative order, a destination address field, a source address field and a data field, and an output port, the repeater including a security system for allowing a transmission of said data packet from the output port, said output port having an associated address, when the associated address matches the destination address field, and for allowing a transmission of an output data packet from said output port when the associated address does not match said destination address field, said output data packet including an unmodified destination address field and a modified data field;

means, coupled to said repeater front-end, for asserting:

a destination address present signal after said destination address field is transmitted from said output port; and a source address present signal after said source address field is transmitted from said output port; and means, coupled to said asserting means and to said repeater front-end and responsive to said source address present signal, for controlling a format of said output data packet, said controlling means inhibiting said security system from allowing transmission of a disrupted source address field in said output data packet when a source address transmit feature is enabled and said source address present signal is deasserted, otherwise said controlling means allowing said security system to provide said modified source address field in said output data packet.

9. An apparatus for controlling a disrupt response to a data packet, comprising:

a repeater including an input port for receiving a data packet having a first field, a second field and a third field, and an output port, said repeater including a security system for allowing a transmission of said data packet from said output port, said output port having an associated address, when said associated address matches said first field, and for allowing a transmission of an output data packet from said output port when said associated address does not match said first field; and a delay disrupt controller, coupled to said security system, for selectably controlling said security system, said security system operating in a particular one mode selected from a plurality of modes, said plurality of modes including a first mode and a second mode, said first mode providing said output packet with said first field undisrupted, and said second field and said third field disrupted, and said second mode providing said output packet with said first field and said second field undisrupted, and said third field disrupted.

10. The apparatus of claim 9 further comprising:
a memory, coupled to said delay disrupt controller, for storing a delay disrupt control code for selecting said particular one mode.

11. The apparatus of claim 10 wherein said delay disrupt control code has one of a first value and a second value, said delay disrupt controller selecting said first mode for said particular one mode when said delay control code has said first value and selecting said second mode for said particular one mode when said delay control code has said second value.

12. The apparatus of claim 11 wherein said first field is a destination address field.

13. The apparatus of claim 12 wherein said second field is a source address field.

14. The apparatus of claim 13 wherein said third field is a data field.

15. The apparatus of claim 9 wherein:
said repeater includes a second output port; and
said security system transmits said data packet from said second output port having a second associated address when said second associated address matches said first field, said security system transmitting a second output data packet from said second output port when said second associated address does not match said first field; and
said apparatus further comprising:
a second delay disrupt controller, coupled to said security system, for selectably controlling a transmission of said second output packet by said security system having a second particular one of said first mode and said second mode, said first mode providing said second output packet with said first field undisrupted, and said second field and said third field disrupted, and said second mode providing said second output packet with said first field and said second field undisrupted, and said third field disrupted.

16. The apparatus of claim 15 wherein said particular one mode is said first mode and said second particular one mode is said second mode.

17. The repeater of claim 15 wherein said first field is a destination address field and said second field is a source address field.

18. The apparatus of claim 9 wherein:
said repeater includes a second output port;
said security system transmits said data packet from said second output port having a second associated address when said second associated address matches said first field, said security system transmitting a second output data packet when said second associated address does not match said first field.

19. The repeater of claim 18 wherein second associated address does match said first field.

20. The repeater of claim 18 wherein said first associated address does not match said first field.

21. The repeater of claim 20 wherein said second associated address does match said first field.

22. The repeater of claim 20 wherein said second associated address does not match said first field.

23. In a system including a plurality of multi-port repeaters making up a network, a particular repeater comprising:
a repeater front-end including an input port for receiving a data packet having, in relative order, a destination address field, a source address field and a data field, and an output port, the repeater including a security system for allowing a transmission of said data packet from said output port, said output port having an associated address, when said associated address matches said destination address field, and for allowing a transmission of an output data packet from said output port when said associated address does not match said destination address field, said output data packet including an unmodified destination address field and a modified data field;
means, coupled to said repeater front-end, for asserting:
a destination address present signal after said destination address field is transmitted from said output port; and
a source address present signal after said source address field is transmitted from said output port; and
means, coupled to said asserting means and to said repeater front-end and responsive to said source address present signal, for controlling a format of said output data packet, said controlling means disabling said security system from allowing a transmission of a disrupted source address field in said output data packet when a source address transmit feature is enabled and said source address present signal is deasserted, otherwise said controlling means allowing said security system to allow a transmission of said modified source address field in said output data packet.

* * * * *